F. W. HINES.
BANK CHECK.
APPLICATION FILED APR. 14, 1921.

1,414,279.

Patented Apr. 25, 1922.

UNITED STATES PATENT OFFICE.

FRANK W. HINES, OF THE UNITED STATES ARMY.

BANK CHECK.

1,414,279.

Specification of Letters Patent. Patented Apr. 25, 1922.

Application filed April 14, 1921. Serial No. 461,432.

(FILED UNDER THE ACT OF MARCH 3, 1883, 22 STAT. L., 625.)

*To all whom it may concern:*

Be it known that I, FRANK W. HINES, sergeant, Quartermaster Corps, a citizen of the United States, residing at Washington, District of Columbia, have invented an Improvement in Bank Checks, of which the following is a specification.

The invention described herein may be used by the Government, or any of its officers or employees in prosecution of work for the Government, or by any other person in the United States, without payment to me of any royalty thereon.

This invention relates to printed matter, more particularly to bank checks, drafts, and other negotiable and non-negotiable evidences of debt which are so formed, that when properly filled out by the maker, they will be incapable of falsification or alteration.

One of the principal purposes of this invention is to produce an instrument of the character specified which will enable the maker to limit the value of the check without employing stamping or similar machines previously used for this purpose.

Another important object of this invention is to effect an instrument which, while having the protective advantages specified, does not depart in dimensions or otherwise from the standard form which commercial practice has established.

Other objects of this invention are to effect a protective check which is simple, inexpensive, and always convenient for usage, likewise one which permits a portion of the check to be removed for the purpose of identifying the amount without mutilating or in any manner damaging the check so as to render handling difficult.

With these and other objects in view, my invention consists in certain novel details of construction, combination, and arrangement of parts to be more specifically hereinafter set forth and claimed.

Briefly stated, this invention consists in providing a standard form of check, bearing the usual data, indicating the name of the payee, amount of the check (written and in numerals) and signature of the maker or drawer, with a plurality of vertical columns affording spaces for an additional signature of the maker, each column having at its upper end an amount designation and immediately above this a circular series of perforations permitting the removal of a part of the check adjacent the designation, so that the part punched out when taken in conjunction with the counter signature will definitely limit the value of the check to the amount drawn.

In the accompanying drawings, in which corresponding parts are indicated by similar reference characters:

The figure is a face view of a check, constructed in accordance with the principles of this invention, showing the amount for which the check is drawn, properly countersigned and punched.

To prevent fraudulent alteration of checks, drafts, and other forms of negotiable instruments it has been the prevailing practice to limit the value of the check or the like by means of stamping machines and perforators. While these machines are exceedingly valuable in offices, they are of little value to the many banking people who usually employ a pocket check book and issue checks away from the office where these machines are not available. It is therefore the aim and purpose of this invention to provide a simple and efficient check which will afford the same, if not a greater degree of safety to the maker, than would be had from the use of the devices heretofore used for this purpose.

In the illustrated embodiment characterizing this invention, there is shown a check 1, of the usual construction, bearing the date, number of check, title of bank, name of payee, amount for which drawn (written and in numerals) and the name of the maker or drawer.

In order to equip the preceding form with the safety features noted, the face of the check is provided with a plurality of parallel laterally spaced lines 2, extending vertically from the lower edge of the check to the longitudinal lines 3 to form a series of vertical columns 4. In each of these columns adjacent its upper end is an amount designation 5, the designations in the respective columns progressing from left to right beginning with 5 and terminating with 15,000 dollars, the increase being by 5, 25, 100, 1,000 and 3,000, although it is to be understood these amounts may be varied according to requirements.

In each of the columns immediately above the amount designation is a circular series of perforations forming disks 6, to be punched out by pen or in any other convenient manner. To prevent accidental displacement of these disks when folding the check, likewise to avoid the possibility of their replacement for fraudulent purposes, a segment 7 of the circular series of perforations is omitted, thus necessitating a slight tearing of the check before the disks can be entirely removed.

The remaining space in the respective columns below the amount designation is intended to receive the counter signature 8 of the maker, which is placed in the column having a designation corresponding to the amount of the check, or in the event the amount of the check is not indicated in any of the columns then the signature is placed in a column containing the nearest approximation of the face value of the check, as for instance, if the latter was drawn for $250, since none of the columns contain this designation, the maker would sign in the $300 column.

To assist the maker in filling out the check, there is also provided at the left edge thereof a caution 9, advising that the check is not to be honored for an amount in excess of the smallest amount punched and countersigned.

The structural arrangement of this improved check having been defined, the operation of properly filling it out will be seen to be as follows:

After the maker or drawer has supplied the blank check with the required data such as date, name, amount of check (both written and in numerals) and the signature, it is countersigned in the column bearing the designation corresponding to the face value of the check, or the nearest approximation thereof. The disk adjacent this amount is then punched out and the check is ready for circulation.

To raise the amount of a check protected in this manner, it would be necessary to remove a disk in one of the columns having a suitable designation, replace in some manner the disk originally punched out, efface the original counter signature and provide another opposite the amount the check is to be raised to. Manifestly before attempting these numerous changes, any individual who otherwise would be inclined to raise the check would execute a new instrument in its entirety.

In conclusion, it is evident a check, filled out as hereinbefore described, is fully protected against fraudulent alteration by a simple expedient which does not require any deviation from the usual form to which bank cashiers have become accustomed nor necessitate mutilation of the check, particularly along its edges, which would tend to make handling, especially in banks, extremely difficult.

Having defined my invention, what I claim to be new and wish to secure by Letters Patent is:

A check form designed to be drawn for not more than a maximum amount, and upon which is provided a series of vertical columns affording spaces for an additional signature of the maker, each column having an amount designation adjacent its upper end, the designations in the respective columns progressing by predetermined amounts from left to right of the check, and a circular series of perforations in each column forming a disc, each of said series having a segment omitted to effect an irregular section in the edge surrounding the opening produced by removal of the disc to prevent replacement of the latter, the removed portion of the check functioning in conjunction with the additional signature to limit the value of the check to the amount of the designation.

FRANK W. HINES.